United States Patent [19]

Ballard

[11] Patent Number: 4,484,754

[45] Date of Patent: Nov. 27, 1984

[54] RING SEAL WITH OVERLAPPING FLANGES FOR CONTAMINANT TRAPPING

[76] Inventor: Michael J. Ballard, P.O. Box 15384, Baton Rouge, La. 70895

[21] Appl. No.: 575,709

[22] Filed: Jan. 31, 1984

[51] Int. Cl.$^3$ .............................................. F16J 15/44
[52] U.S. Cl. ...................................... 277/53; 277/24; 277/192
[58] Field of Search ..................................... 277/38–41, 277/44–46, 53, 55, 81 R, 81 S, 24, 81 P, 85, 91, 93 R, 93 SD, 192–195, 198, 199

[56] References Cited

U.S. PATENT DOCUMENTS

| | | | |
|---|---|---|---|
| 3,311,382 | 3/1967 | Dolhun | 277/93 X |
| 4,215,870 | 8/1980 | Escue | 277/93 R |
| 4,294,453 | 10/1981 | Inouye et al. | 277/41 X |
| 4,402,515 | 9/1983 | Malott | 277/53 X |

FOREIGN PATENT DOCUMENTS 878371   9/1961   United Kingdom .............. 277/81 S Primary Examiner—Robert S. Ward
Attorney, Agent, or Firm—William D. Kiesel

[57] ABSTRACT

A ring seal between a housing and a rotatable shaft comprising a plurality of ring members generally concentric with the shaft. A first ring member is provided having an outer annular surface facing externally of the housing, an inner annular surface facing internally of the housing and an annular recess in the inner surface. A flange is provided in the first member, projecting radially inward into the annular recess, thus forming an annular channel in the first member. An opening is provided, opening from the lowest point in the channel of the first member to the outer surface. The first member is fixedly attachable to the housing so as to allow for free rotation of the shaft within the first member. A second ring member is positioned axially internal to the first member and is provided with an outer annular surface facing the inner surface of the first member and an inner annular surface facing internally of the housing. The second member is fixedly attachable to the shaft and is provided with a flange which extends into the recess of the first member. A seal is thus provided which traps contaminants in the channel of the first member, allowing them to flow back to the atmosphere through the opening in the first member, whether the shaft is rotating or in a static position.

13 Claims, 4 Drawing Figures

RING SEAL WITH OVERLAPPING FLANGES FOR CONTAMINANT TRAPPING

BACKGROUND OF THE INVENTION

1. Field of Invention

This invention relates broadly to seals which prevent entrance of contaminants into various types of machinery, and more particularly, to seals between a rotatable shaft and a housing.

2. Prior Art

Many industries require the use of machines in which a rotatable shaft is contained by a housing. The housing usually contains lubricated bearings and sometimes additional attachments to the shaft such as turbine blades or gears. There are many types of seals provided between a shaft and a housing so as to prevent the leakage of lubricants from the housing and/or to prevent external contaminants from entering the housing along the shaft. In high speed operations of such rotating shaft mechanisms, contaminants to the internal lubricant result in increased wear, costly replacement of parts and, consequently, down time for the mechanism.

It is known to provide a sealing ring assembly comprising a first ring fixed to the housing and a second ring exterior to the housing and fixed to rotate with the shaft. Such an assembly is disclosed by U.S. Pat. No. 4,002,479, invented by David C. Orlowski and issued on May 10, 1977. In Orlowski, the first ring is held fixed to the housing by an O-ring and has an annular recess which matingly receives an annular flange of the rotating second member so as to allow free rotation without contact between the flange and the recess. The contaminants are theoretically discharged through an opening in the bottom of the recess in the first ring. The second ring is secured to the shaft by an O-ring. This arrangement has failed to prevent certain contaminants from entering the housing. An example of such a problem arises in the steam turbine industry, where such a seal is subject to an environment of steam, itself a contaminant, and also particles carried in the steam. In such an environment, steam easily penetrates the crevices between the first and second rings, condenses and is carried into the housing along the rotating shaft. An even greater contamination problem is created when the shaft is at rest and contaminants are allowed to build up and travel along the surfaces of the static rings to the static shaft which provides less frictional resistance to the contaminants than a moving shaft. A further problem arises when the O-rings or the sealing rings must be changed, which requires extensive down time while other components are removed in order to allow the sealing rings to be removed from the shaft.

SUMMARY OF THE INVENTION

Considering the above, it is an object of this invention to provide a ring seal between a housing and a rotatable shaft which prevents external contaminants such as steam from entering the housing, whether the shaft is rotating or static.

Still another object of this invention is to provide such a seal which requires relatively little time and effort to install and remove.

Still another object of this invention is to provide such a seal that will require relatively little service and infrequent replacement.

Still further objects and advantages of this invention shall become apparent from the ensuing descriptions of the invention.

Accordingly, a ring seal between a housing and a rotatable shaft is provided, comprising a plurality of ring members generally concentric with the shaft. A first ring member is fixedly and sealingly attachable within the housing and has an outer annular surface facing externally of the housing and an inner annular surface facing internally of the housing. A second ring member is positioned axially internal to the first member and is provided with an outer annular surface facing the inner surface of the first member and an inner annular surface facing internally of the housing. The second member is fixedly and sealingly attachable to the shaft so as to rotate relative to the fixed position of the first ring member. The first ring member has an annular recess in its inner surface which receives an annular flange formed on the outer surface of the second member. A flange in the recess of the first member also forms a channel through which captured contaminants flow downward to an exit opening provided in the first member. The first and second ring members can be split so as to facilitate easy installation and removal. A third ring member is then provided which locks the second ring member into position and holds that position relative to the shaft and the first member.

PREFERRED EMBODIMENTS OF THE INVENTION

Figure 1:
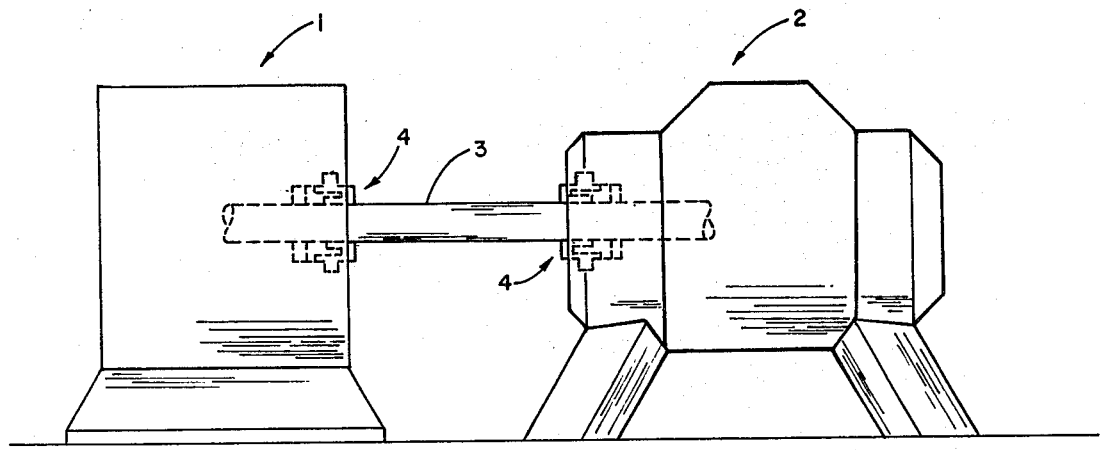
FIG. 1 is a view of a typical arrangement in which the ring seals may be used.

FIG. 1 illustrates a typical setting in which the invention may be used, where a rotatable shaft 3 passes through machinery 1 and 2. In such an environment the interiors of the machinery 1 and 2 and possibly individual compartments within the machinery must be sealed in order to prevent entry of external contaminants which would enter along the shaft 3. The invention, generally denoted as 4, serves to provide such a seal.

Figure 2:
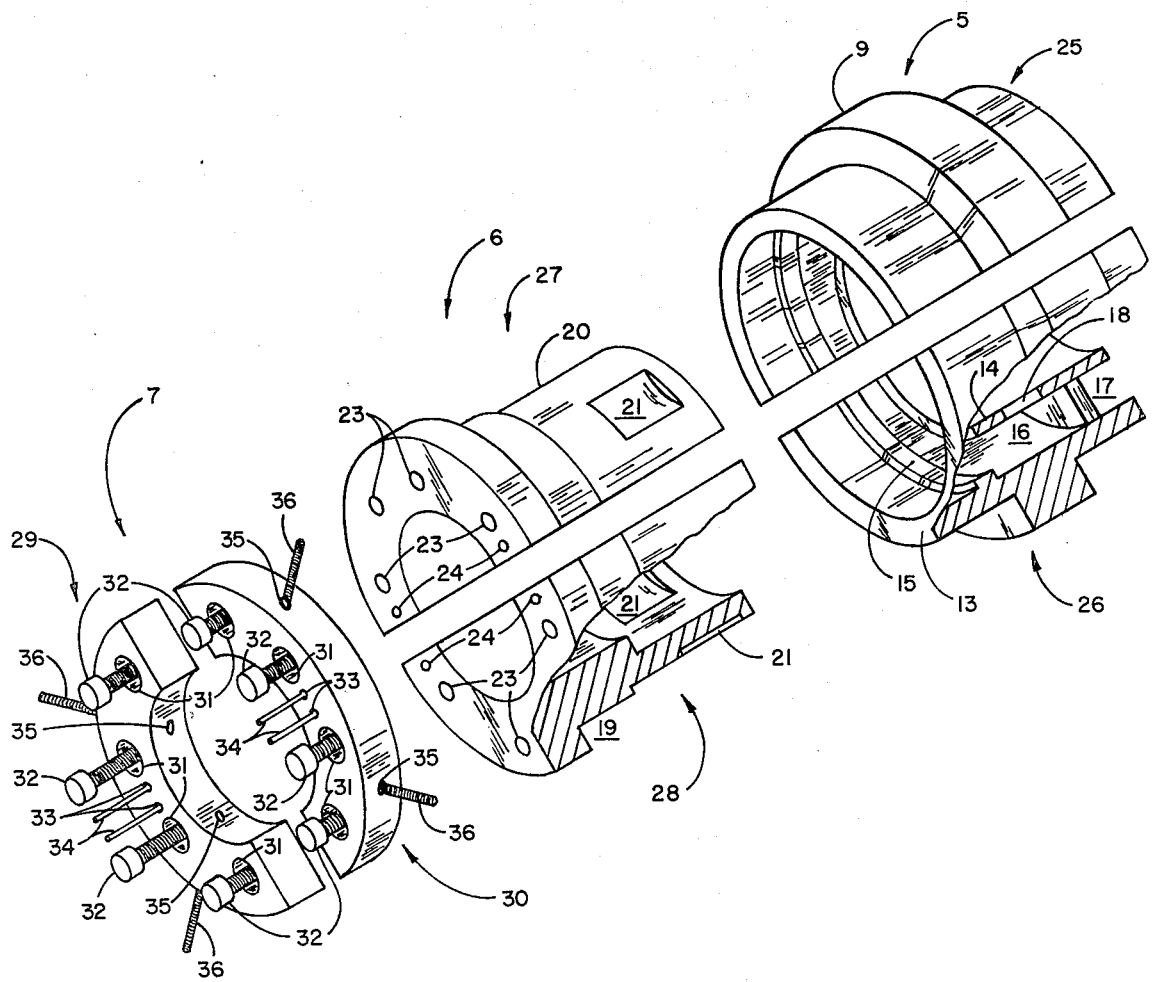
FIG. 2 is a three-dimensional exploded view of a preferred embodiment of the invention.
Figure 3:
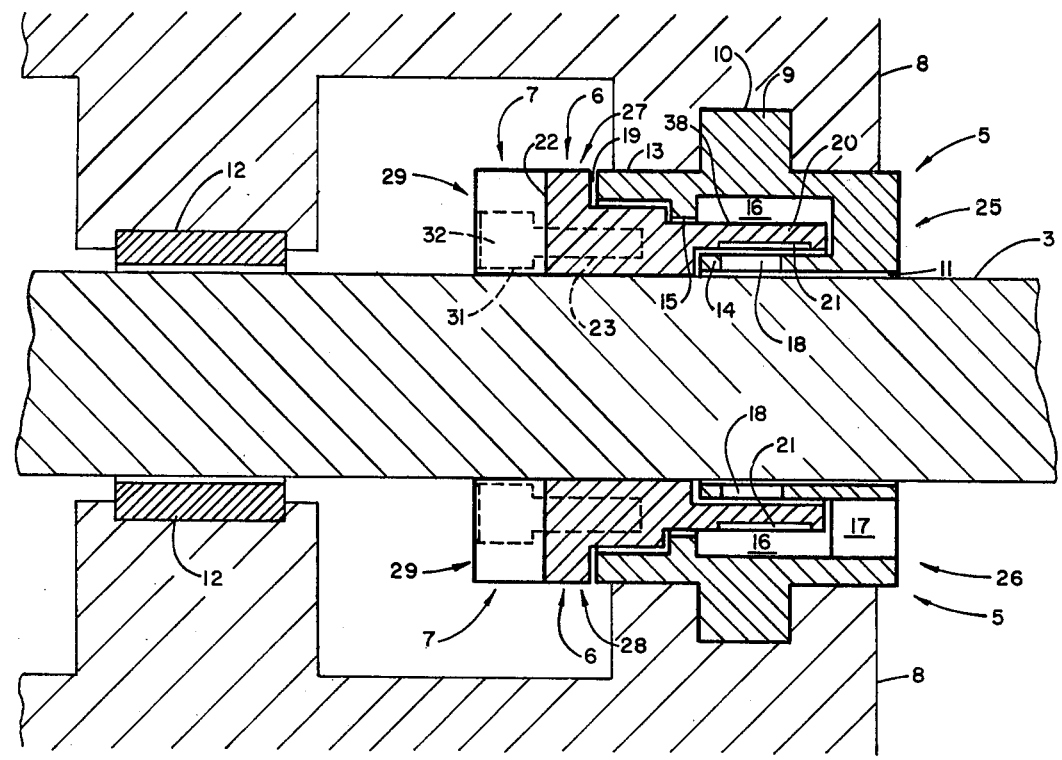
FIG. 3 is a sectional view of a preferred embodiment of the invention in place between a housing and a shaft.
Figure 4:
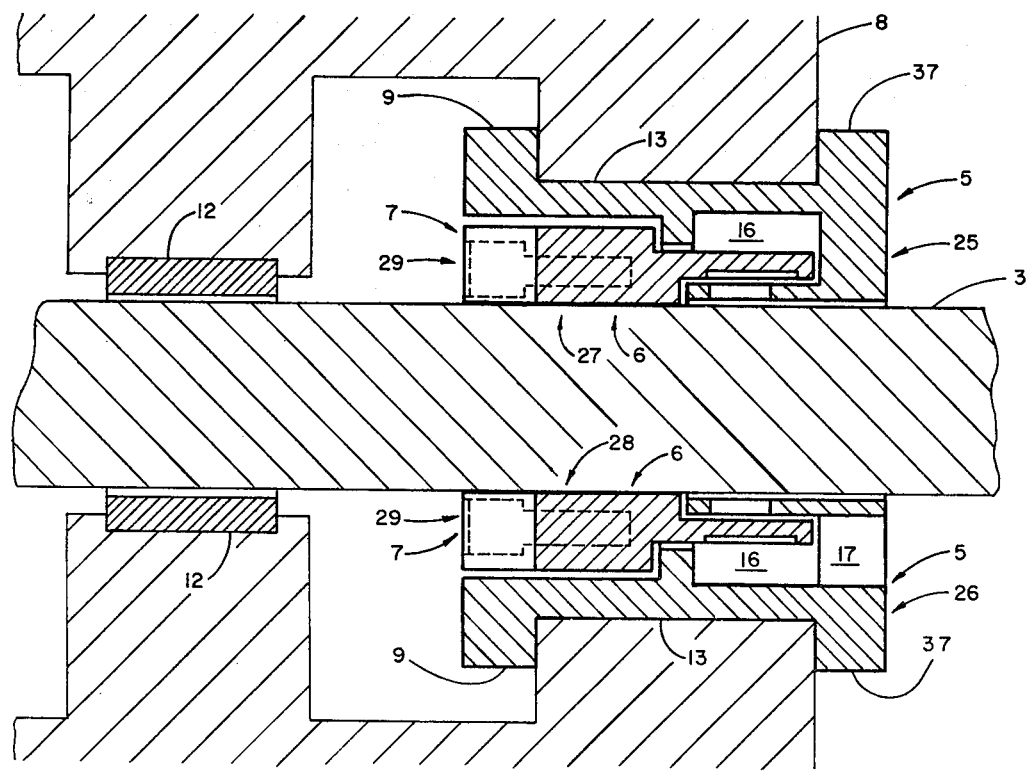
FIG. 4 is a sectional view of another preferred embodiment of the invention.

As shown in FIG. 2, the three major components of the invention and preferred embodiments thereof are first ring member 5, second ring member 6 and third ring member 7. The three ring members 5, 6 and 7 are located between a housing 8 and the shaft 3 as shown in FIG. 3. The seal prevents external contaminants from reaching an internal component such as a bearing 12. The first member 5 is held fixedly and sealingly in place within the housing 8. In the preferred embodiment shown in FIG. 3, this is accomplished by providing an outer annular fourth flange 9 which is held in place in a compatible groove 10 in the housing 8. In the embodiment shown in FIG. 4, the fourth flange 9 is located such that it it grips the inner surface of the housing 8. A similar flange 37 may be added to grip the outer surface of the housing 8. The center of the first ring member 5 is of large enough diameter to allow free rotation of the shaft 3 without contact with the first member 5. An annular space 11 is thus formed when the first member 5 is in place around the shaft 3. It is preferred that the perpendicular distance inside the annular space 11 from the shaft 3 to the first member 5 is 0.020 to 0.030 inches. The first member 5 is provided with a first flange 13 extending toward the interior of and axially adjacent to the housing 8. A second flange 14 also extends toward the interior of the housing 8, but is axially adjacent to the shaft 3. A third flange 15 extends radially inward from the first flange 13, thus forming an annular channel 16 in the first member 5. An opening 17 is provided at the lowest point in the channel 16, thus providing an exit point for contaminants to the atmosphere. At least one pressure relief hole 18 is provided in the second flange 14 in order to provide pressure equilibrium and prevent clogging in the channel 16.

The second member 6 is fixedly and sealingly attachable to the shaft 3 so as to rotate with the shaft. The second member 6 is located just to the interior of the housing 8 from the first member 5. In the preferred embodiment shown in FIG. 3, the second member 6 is provided with an annular recess 19 so as to compatibly receive the flange 13 of the first member 5, while allowing free rotation of the second member 6. In the preferred embodiment shown in FIG. 4, the first flange 13 of the first member 5 encases the second member 6. An annular flange 20 extends into the channel 16 axially adjacent to the second flange 14 of the first member 5. In a preferred embodiment, depressions 21 are provided in the surface of flange 20 adjacent to the third flange 14 of the first member 5. In another preferred embodiment, depressions 21 are also provided in the surface of flange 20 adjacent to the channel 16 of of the first member 5. It is preferred that the depressions 21 are arcuate in shape. The depressions 21 serve to promote the flow of contaminants to the exit point at opening 17. In a preferred embodiment, the exit opening 17 is at least as wide as the longest dimension of one of the depressions 21.

In another preferred embodiment, the inner surface 22 of the second member 6 is provided with threaded holes 23 and guide pin holes 24 running generally parallel to the shaft 3. The first member 5 is split into an upper half 25 and lower half 26. Correspondingly, the second member 6 is also split into an upper half 27 and a lower half 28. A third member 7 is provided in order to lock the upper and lower halves, 27 and 28, of the second member 6 together. The third member 7 is split into a left half 29 and a right half 30. For maximum strength, the plane between the left and right halves, 29 and 30, of the third member 7 should be generally perpendicular to the plane between the upper and lower halves, 27 and 28, of the second member 6. Locking screw holes 31 are provided through the third member 7, which are alignable with and of a diameter slightly larger than the threaded holes 23 in the second member 6. Locking screws 32 are provided which are insertable through locking screw holes 31 in the third member 7 and threadable into threaded holes 23 in the second member 6. Guide-pin holes 33 are also provided through the third member 7, which are alignable with the guide-pin holes 24 of the second member 6. Guide pins 34 are provided which are insertable through guide pin holes 33 in the third member 7 and into guide pin holes 24 of the second member 6. Thus the upper half 27 and lower half 28 of the second member 6 may be aligned and locked together using the third member 7, guide pins 34 and locking screws 32. The upper half 25 and lower half 26 of the first member 5 are held in place by the housing 8. The ring members 5, 6 and 7 can then be easily removed without the necessity of removing other components which may be attached to the shaft.

In another preferred embodiment, threaded set screw holes 35 are provided through the third member 7 extending radially perpendicular to the shaft 3. Set screws 36 are threadable into the set screw holes 35 so as to bear against the shaft 3 and thus hold the axial positions of members 6 and 7 relative to the shaft 3.

The second and third ring members, 6 and 7, recess 19 and flange 20 are of such a diameter so as to allow free rotation within, but with minimum outer clearance from, the housing 8 and the first member 5. Thus, as contaminants enter the annular space 11, they flow around the second flange 14 of the first member 5 and are trapped in the channel 16 where they accumulate and flow back out to the atmosphere through exit opening 17. This flow of contaminants can occur whether the shaft 3 is rotating or static. If the shaft 3 is rotating, the indentations 21 serve to pick up the contaminants and pump them into the channel 16. The pressure relief hole 18 prevents excessive differential pressure from developing on either side of the second flange 14.

It is preferred that the first and second members, 5 and 6, be constructed of a material with anti-spark qualities, such as brass. In order to add strength to the assembly, the third member 7 should be constructed of a high strength material such as steel.

It is preferred that certain tolerances be maintained in order to assure the maximum sealing effect. The perpendicular distance between the outer surface 38 of flange 20 and the third flange 15 of first memeber 5 should be maintained at 0.032 to 0.062 inches. The axial perpendicular distance from the first flange 13 of first member 5 to second member 6 should also be maintained at 0.032 to 0.062 inches. The radial perpendicular distance from the first flange 13 of first member 5 to second member 6 should be maintained at 0.020 to 0.050 inches. The radial perpendicular distance from the third flange 15 of first member 5 to the flange 20 of second member 6 should be maintained at 0.010 to 1.015 inches. The depth of the channel 16 measured radially from the end of third flange 15 should be maintained at 0.040 to 0.060 inches. The internal diameter of the second and third members, 6 and 7, should be a maximum of 0.005 inches greater than the diameter of the shaft 3.

Thus, as can be seen, a ring seal is provided which allows for external contaminant removal whether the shaft is rotating or static. The seal is easily installable and removable without having to slide the seal off of the shaft. The seal is self-cleaning and self-locking, thus requiring little service and infrequent replacement. There are, of course, many alternate embodiments not specifically described but which are intended to be included within the scope of this invention as defined by the following claims.

I claim:

1. A ring seal between a housing and a rotatable shaft, comprising:
   (a) a first ring member generally concentric with a rotatable shaft and fixedly and sealingly attachable to a housing between said housing and said shaft, said first member having an outer annular surface facing externally of said housing and an inner annular surface facing internally of said housing; an annular recess in said inner surface, forming an outer first annular flange axially adjacent to said housing and an inner second annular flange axially adjacent to said shaft; an annular third flange extending perpendicular to and radially inward from said first flange partially into said recess, forming an annular channel; and an opening parallel to said shaft and opening from the lowest point in said channel to said outer annular surface of said first member; and (b) a second ring member generally concentric with said shaft, being fixedly and sealingly attachable to said shaft, and having an outer annular surface facing said inner surface of said first member and an inner annular surface facing internally of said housing; and an annular flange extending axially from said outer surface of said second member and extending into said recess in said first member between said second and third flanges of said first member.

2. A ring seal as described in claim 1, wherein said outer surface of said second member is provided with an annular recess axially adjacent to said housing so as to compatibly receive said first flange of said first member.

3. A ring seal as described in claim 1, wherein said first member is provided with at least one annular fourth flange extending radially outward from said first member, for fixing the position of said first member within said housing.

4. A ring seal as described in claim 2, wherein a plurality of threaded holes are provided in said inner surface of said second member, extending generally parallel to said shaft and partially into said second member, said ring seal further comprising:

(c) a third ring member generally concentric with said shaft, fixedly and sealingly attachable to said shaft, and having an outer annular surface facing said inner surface of said second member; an inner annular surface facing internally of said housing; and a plurality of locking screw holes extending through said third member generally parallel to said shaft, alignable with, and of a diameter slightly greater than, said threaded holes in said second member; and (d) a plurality of locking screws matingly insertable through said locking screw holes in said third member and threadable through said threaded holes in said second member.

5. A ring seal as described in claim 3, wherein said first and second ring members are horizontally split into upper and lower halves and said third ring member is split into left and right halves, each said half of said second member having at least one said threaded hole, and each half of said third member having at least one said locking screw hole.

6. A ring seal as described in claim 4, wherein all said recesses and said flanges are rectangular in section.

7. A ring seal as described in claim 5, wherein the surface of said flange in said second member adjacent to said third flange of said first member is provided with at least one depression.

8. A ring seal as described in claim 6, wherein said opening in said first ring member when aligned with said depression, has a horizontal dimension at least equal to that of said depression.

9. A ring seal as described in claim 7, wherein said second flange of said first member is provided with at least one hole opening radially from said shaft to said recess in said first member.

10. A ring seal as described in claim 8 wherein the surface of said flange in said second member adjacent to said second flange of said first member is provided at least one depression.

11. A ring seal as described in claim 9, wherein each said depression is arcuate in shape.

12. A ring seal as described in claim 10, wherein said third member is provided with a plurality of guide pin holes extending through said third member generally parallel to said shaft and wherein said inner surface of said second member is also provided with a plurality of guide pin holes extending generally parallel to said shaft and partially into said second member and alignable with said guide pin holes in said third member each said half of said second and third member having at least one said guide pin hole, said ring seal further comprising:

(e) a plurality of guide pins, matingly insertable into said guide pin holes in said second and third members.

13. A ring seal as described in claim 11, wherein said third member is provided with at least one threaded radial hole perpendicular to said shaft opening from said shaft to the interior of said housing, said ring seal further comprising:

(f) at least one set screw matingly threadable into said threaded radial hole in said third member.

* * * * *

UNITED STATES PATENT AND TRADEMARK OFFICE
CERTIFICATE OF CORRECTION

PATENT NO. : 4,484,754
DATED : November 27, 1984
INVENTOR(S) : Michael J. Ballard It is certified that error appears in the above-identified patent and that said Letters Patent is hereby corrected as shown below:

```
In Claim  5, Column 5, Line 45 delete "3" and substitute
--4--.
In Claim  6, Column 6, Line  6 delete "4" and substitute
--5--.
In Claim  7, Column 6, Line  8 delete "5" and substitute
--6--.
In Claim  8, Column 6, Line 12 delete "6" and substitute
--7--.
In Claim  9, Column 6, Line 16 delete "7" and substitute
--8--.
In Claim 10, Column 6, Line 20 delete "8" and substitute
--9--.
In Claim 11, Column 6, Line 24 delete "9" and substitute
--10--.
In Claim 12, Column 6, Line 26 delete "10" and substitute
--11--.
In Claim 13, Column 6, Line 39 delete "11" and substitute
--12--.
```

Signed and Sealed this

Second Day of July 1985

[SEAL]

Attest:

DONALD J. QUIGG

Attesting Officer    Acting Commissioner of Patents and Trademarks